Oct. 31, 1961 G. E. ROWE 3,006,112
GLASS BLOW MOLD MECHANISM FOR GLASSWARE FORMING MACHINES
Original Filed Nov. 16, 1953 2 Sheets-Sheet 1
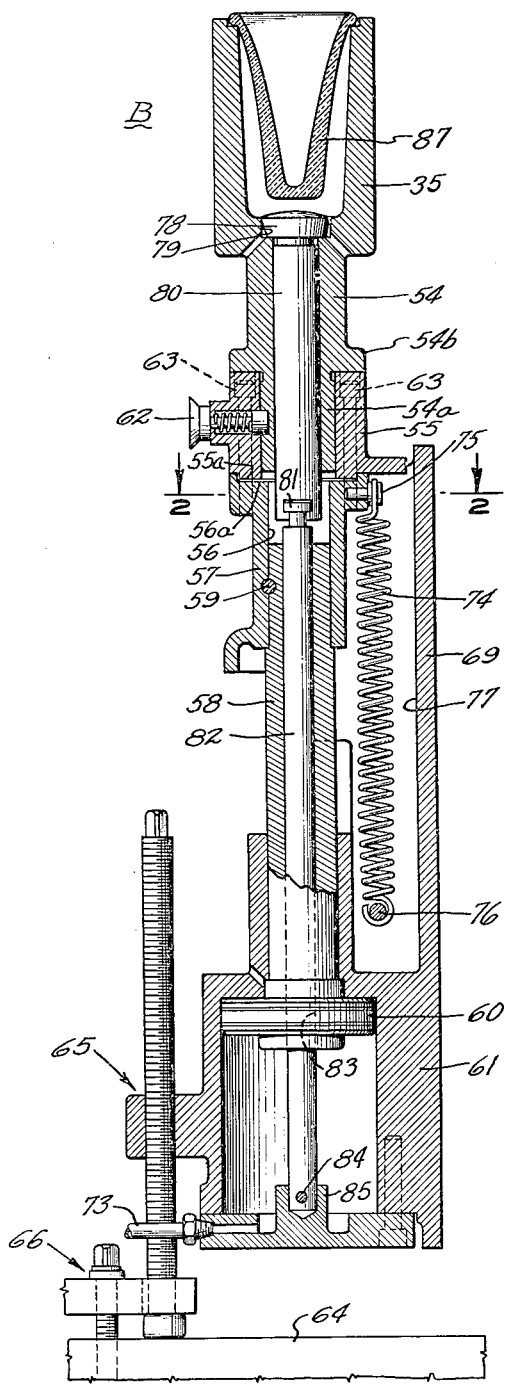
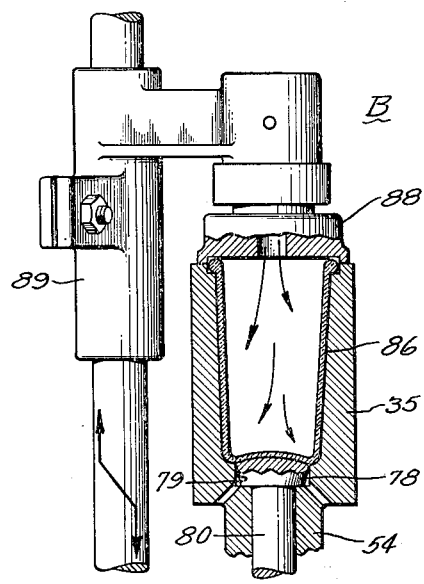
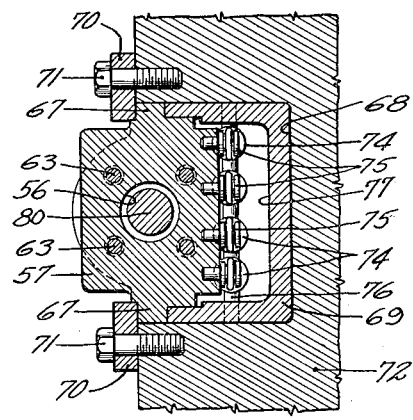
INVENTOR
GEORGE E. ROWE
BY Bates & Willard
ATTORNEYS

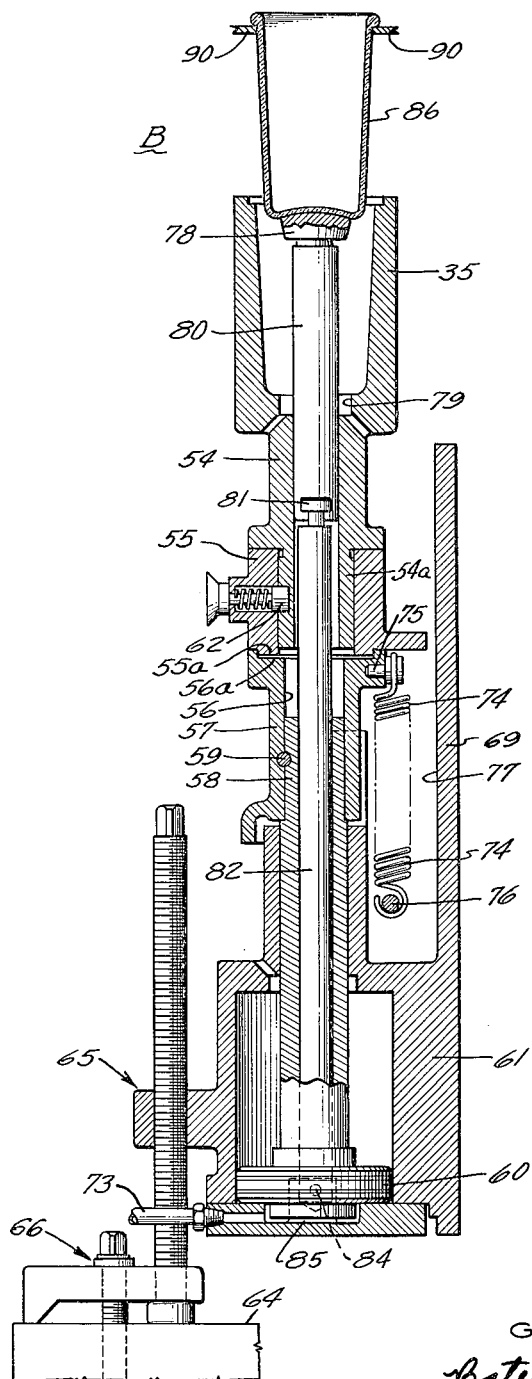

United States Patent Office 3,006,112
Patented Oct. 31, 1961

3,006,112
GLASS BLOW MOLD MECHANISM FOR
GLASSWARE FORMING MACHINES
George E. Rowe, Wethersfield, Conn., assignor to Emhart
Manufacturing Company, Hartford, Conn., a corporation of Delaware
Original application Nov. 16, 1953, Ser. No. 392,315. Divided and this application Feb. 3, 1958, Ser. No. 712,925
7 Claims. (Cl. 49—41)

This application is a division of my co-pending application, Serial No. 392,315 filed November 16, 1953, for improvements in Glassware Forming Machines, and is filed for the purpose of claiming the invention thereof that is embodied in a novel blow mold mechanism or unit by which a suitable molten glass blank or parison delivered to the blow mold thereof may be formed to provide a tumbler or other glass article of suitable external shape.

Such mechanism comprises an upright one-piece or block type blow mold, a blow head and a blow mold bottom plate. The blow mold has a central opening in its bottom and is open at its top. It is axially movable between a relatively raised, active position at a blowing station at which the blowing of the glass blank or parison to form the glass article of the final shape desired occurs and a downwardly retracted, inactive position. The blow head is movable from a relatively raised, out-of-the-way position to a lowered, operative position on the open upper end of the blow mold when the latter is in its raised position at the blowing station and a suitable blank or parison has been delivered thereto. The bottom plate is located constantly at the blowing station in position to be seated in the central opening in the bottom of the blow mold when the latter is raised to its active position at the blowing station. The bottom plate remains in that position so that the finally blown article will remain standing thereon when the blow head has been removed and the blow mold is stripped downwardly therefrom after a blowing operation, the walls of the cavity of the blow mold having a downward and inward taper from its open upper end to its bottom to provide for such stripping.

The means for supporting the blow mold for axial movements between its raised, active position at the blowing station and its lowered, inactive position and for reciprocating it between these two positions and the means for maintaining the bottom plate constantly in a relatively fixed position at the blowing station are such as to permit the raised position of the blow mold and the relatively fixed position of the blow mold bottom plate to be adjusted vertically in unison within limits while assuring maintenance of cooperative relationship of these parts at all vertically adjusted positions thereof.

A practical embodiment of the invention as shown in the drawings and described in the specification of my co-pending parent application, Serial No. 392,315, is shown in the accompanying drawings and described in the following specification.

In the accompanying drawings:

FIG. 1 is a vertical section through the improved blow mold mechanism;

FIG. 2 is a horizontal cross-section along the line 2—2 of FIG. 1;

FIG. 3 is a fragmentary vertical cross-sectional view of the blow mold and associate parts during the blowing operation; and FIG. 4 is a vertical cross-sectional view like FIG. 1 but with the blow mold in a downwardly retracted position and with takeout tongs indicated for removal of the blown glass article.

The blow mold 35 at blowing station B is a one-piece or block-type mold instead of the customary two-part blow mold. Blow mold 35 has a depending tubular stem 54. The lower end portion of this mold stem is indicated at 54a as fitting in a sleeve 55 and as having an external flange 54b resting upon the upper end surface of this sleeve. The sleeve 55 has a reduced lower end portion 55a fitting in a counterbore 56a at the upper end of a vertical bore 56 formed through a tubular support or slide block 57. Bore 56 receives the upper end portion of a tubular piston rod 58 which is pinned at 59 to block 57. Piston rod 58 extends upwardly from a piston 60 that is reciprocable in a vertically disposed air cylinder 61. A spring-loaded latch pin 62 fastens the sleeve 55 releasably to the blow mold stem and suitable fastening means, indicated by the cap screws 63, fasten the sleeve 55 to the underlying block 57. The arrangement permits selective use of different blow molds, which are intended for use in the production of various hollow articles of a wide variety of sizes and shapes.

The piston 60 and cylinder 61 comprise an air motor and are carried by a slide frame 69 and are adjustable vertically as a unit with relation to a fixed level support 64, being supported on the latter by an adjusting mechanism indicated at 65 in FIGS. 1 and 4. The clamping arrangement indicated at 66 is to maintain any height adjustment that has been effected by the adjusting mechanism 65.

The slide block or tubular support 57 is formed at its opposite sides with a pair of integral vertical slide strips 67 which are disposed in the outer part of a square-cornered guideway 68 in sliding contact with the vertical outer edges of the flanges of the slide frame 69 which is vertical and channel-shaped. The said slide strips and flanges comprise cooperative slidably contacting guide elements on the tubular support and slide frame respectively. Retaining strips 70 are fastened by screws 71 to a stationary part 72 of the machine structure. The vertical guideway 68 is formed in the stationary part 72 and the channel-shaped guide member 69 and part of the wall of cylinder 61 are disposed therein for vertical sliding movements relative thereto when adjusting means 65 is operated.

An upward stroke of piston 60 in cylinder 61 from the lower end of that cylinder as shown in FIG. 4 to the upper end thereof as in FIG. 1 will raise tubular piston rod 58, slide block 57, connecting sleeve 55 and the blow mold 35 as a unit to the positions shown in FIG. 1. This upward stroke of the piston may be effected by air under pressure admitted at the bottom end of the cylinder, as by the pipe 73. Return of these parts to their lowered positions may be effected by the action of coil springs 74 which have their upper ends fastened, as by pins 75, to slide block 57 and their lower ends fastened to a crossrod 76 in the lower part of a space 77 back of the slide block in the channel-shaped integral upward extension 69 of the wall of cylinder 61, the cross rod being fixed in place in such extension.

A blow mold bottom plate 78 fits in a central opening 79 in the bottom part of mold 35 when the blow mold is in its raised position as shown in FIG. 1. This blow mold bottom plate is carried by a depending vertical rod section 80 that extends slidably through the blow mold stem 54 into the bore 56 of slide block 57 where it is connected, as by a bayonet joint 81, to the upper end of a vertical rod section 82 that extends through the bore of the piston rod 58 and through a central opening 83 in the piston downwardly to the bottom of the cylinder 61 where it is fastened as by a pin 84 in a socket 85 on the bottom end of the cylinder. The arrangement is such that when the blow mold is lowered in the manner described, the blow mold bottom plate 78 will remain at the same level and hence the blow mold will be stripped downwardly from an article 86 that has been formed therein and which rests on the relatively raised bottom plate 78.

A blow head 88 that is carried and operated by conventional blow head operating mechanism 89 is moved from a raised out-of-the-way position downwardly to an active position on the upper end of the blow mold 35 as shown in FIG. 3 and blowing air is supplied thereby into the parison 87 to expand it against the walls of the blow mold cavity to form the article 86. In the example shown, article 86 is a tumbler but other glass articles of different shapes and sizes may be made, molding parts of suitable shapes and sizes being selected and used as described.

After the blowing step has been completed, the blow head will be returned to its raised inactive position, the air pressure within the lower part of cylinder 61 will be relieved so that the springs 74 will return the blow mold 35 downwardly to the position shown in FIG. 4. The blown article may be engaged by suitable takeout tongs, indicated at 90 in FIG. 4, and lifted from the blow mold bottom plate and deposited on a suitable conveyor (not shown) or other suitable support.

The external shape of the parison shall be appropriate for expansion in the one-piece blow mold into an article from which the blow mold can be stripped downwardly.

I claim:

1. In a glassware forming machine, an upright one-piece blow mold open at its upper end and having a central opening in its bottom and a rigid tubular stem depending from its bottom, a vertical cylinder located below a blow mold station, a piston reciprocable in the cylinder, a tubular piston rod extending upwardly from said piston toward the blow mold station, a slide block carried by the upper end of the tubular piston rod, means operatively connecting the blow mold stem with said slide block so that the blow mold is supported by said slide block in position to be raised to said blow mold station when said piston is at the upper end of its stroke in said cylinder and to be lowered to a position below said blow mold station when said piston is returned to the lower end of said cylinder, a blow mold bottom plate fitting the opening in the bottom of the blow mold so as to be raisable therefrom vertically upward in the blow mold, and supporting means for said bottom plate to maintain such plate in a raised position in relation to the blow mold when the latter is lowered from its active position at the blow mold station.

2. In a glassware forming machine, the combination specified by claim 1, wherein said means for supporting said blow mold bottom plate comprises a stationary vertical rod extending upwardly through the tubular piston rod, the slide block, and the tubular stem of the blow mold and carrying the blow mold bottom plate on its upper end.

3. In a glassware forming machine, the combination specified by claim 1, wherein the piston is movable vertically on its upward stroke by air pressure and is lowered by spring action and, in addition, stationary guiding means for the slide block to prevent rotation thereof.

4. In glassware forming apparatus, a one-piece blow mold having its axis disposed vertically and formed with a cavity, the walls of which taper downwardly and inwardly, said mold having open upper and lower ends, a bottom plate adapted at times to close the lower end of the mold and at all times positioned coaxially with the latter, means supporting the bottom plate at a fixed elevation comprising a rod axially aligned with and depending from the bottom plate, means for reciprocating the blow mold axially relative to the bottom plate whereby to position the latter at times at an elevation above the upper end of the blow mold for the removal of a finished article of glassware resting upon said bottom plate, the blow mold reciprocating means comprising a tubular support telescoped over the bottom plate supporting rod and a piston motor operable to reciprocate the tubular support.

5. In glassware forming apparatus, a one-piece blow mold having its axis disposed vertically and formed with a cavity, the walls of which taper downwardly and inwardly, said mold having open upper and lower ends, a bottom plate adapted at times to close the lower end of the mold and at all times positioned coaxially with the latter, means supporting the bottom plate at a fixed elevation comprising a rod axially aligned with and depending from the bottom plate, means for reciprocating the blow mold axially relative to the bottom plate whereby to position the latter at times at an elevation above the upper end of the blow mold for the removal of a finished article of glassware resting upon said bottom plate, the blow mold reciprocating means comprising a tubular support telescoped over the bottom plate carrying rod, a separable connector for attaching the mold to the upper end of the tubular support, a piston motor operatively connected to the lower end of the tubular support for reciprocating the latter and means for adjusting the operating positions of the mold and bottom plate.

6. In glassware forming apparatus, a one-piece blow mold having its axis disposed vertically and formed with a cavity, the walls of which taper downwardly and inwardly, said mold having open upper and lower ends, a bottom plate adapted at times to close the lower end of the mold and at all times positioned coaxially with the latter, means supporting the bottom plate at a fixed elevation comprising a rod axially aligned with and depending from the bottom plate, means for reciprocating the blow mold axially relative to the bottom plate whereby to position the latter at times at an elevation above the upper end of the blow mold for the removal of a finished article of glassware resting upon said bottom plate, the blow mold reciprocating means comprising a tubular support telescoped over the bottom plate carrying rod, a separable connector for attaching the mold to the upper end of the tubular support, a piston motor operatively connected to the lower end of the tubular support for reciprocating the latter, means for adjusting the operating positions of the mold and bottom plate, the bottom plate and blow mold adjusting means comprising a vertically movable slide frame carrying said motor and the supports for the bottom plate and blow mold and means for adjusting the position of the slide frame vertically.

7. In glassware forming apparatus, a one-piece blow mold having its axis disposed vertically and formed with a cavity, the walls of which taper downwardly and inwardly, said mold having onpen upper and lower ends, a bottom plate adapted at times to close the lower end of the mold and at all times positioned coaxially with the latter, means supporting the bottom plate at a fixed elevation comprising a rod axially aligned with and depending from the bottom plate, a tubular support for the blow mold telescoped over the bottom plate supporting rod, a piston motor connected to the lower end of the tubular support for reciprocating the latter and correspondingly moving the blow mold relative to the bottom plate, a vertically movable slide frame upon which the motor and the supports for the bottom plate and blow mold are mounted, and cooperative slidably contacting guide elements on said tubular support and said slide frame, respectively.

References Cited in the file of this patent
UNITED STATES PATENTS
2,050,386    Schutz _____ Aug. 11, 1936